United States Patent [19]
Wolff

[11] 4,251,120
[45] Feb. 17, 1981

[54] SCREW FASTENED CLAMPING NECK ATTACHMENT FOR AN ELECTRICAL HAND OPERATED DRILL

[76] Inventor: Robert Wolff, im Kiesacker, 5446 Engeln, Fed. Rep. of Germany

[21] Appl. No.: 10,487

[22] Filed: Feb. 8, 1979

[30] Foreign Application Priority Data

Dec. 4, 1978 [DE] Fed. Rep. of Germany ....... 2852327

[51] Int. Cl.³ ............................................. F16C 35/06
[52] U.S. Cl. .......................................... 308/22; 64/4; 173/163; 408/124; 408/234
[58] Field of Search .................... 64/3, 4, 6; 408/124, 408/125, 234; 173/170, 163; 308/22, 24, 27, 178

[56] References Cited
U.S. PATENT DOCUMENTS

| | | | |
|---|---|---|---|
| 2,220,791 | 11/1940 | McWhirter | 408/124 X |
| 2,263,277 | 11/1941 | Schumann | 408/234 |
| 2,303,565 | 12/1942 | Luna | 173/163 |
| 2,552,234 | 5/1951 | Thibodeau | 408/124 X |
| 2,553,416 | 5/1951 | Koett | 408/234 |
| 2,777,340 | 1/1957 | Hettwer et al. | 408/124 X |
| 3,244,031 | 4/1966 | Mitchell | 408/234 X |
| 3,724,237 | 4/1973 | Wood | 64/4 |
| 3,759,336 | 9/1973 | Marcovitz | 173/170 X |
| 3,876,015 | 4/1975 | Kivela | 173/170 |
| 4,172,367 | 10/1979 | McCusker | 64/4 |
| 4,197,886 | 4/1980 | MacDonald | 173/163 X |
| 4,207,953 | 6/1980 | Reibetanz et al. | 173/163 X |

*Primary Examiner*—Henry K. Artis
*Attorney, Agent, or Firm*—Abraham A. Saffitz

[57] ABSTRACT

A screw fastened clamping neck attachment for an electrical hand operated drill. The electrical motor of the drill is of the neckless type and has a short rotary shaft extending from the housing. The screw fastened clamping attachment is in the form of two semi-cylindrical bushings adapted to be clamped together at their base portion to form a neck, these bushings, in clamped condition, encasing an extension shaft therebetween which is to be connected to the short shaft of the electrical motor. Preferably the extension shaft has a connecting sleeve end threaded internally with the short shaft threaded externally to provide a threaded connection. Bearings are provided for the extension shaft of the attachment within the semi-cylindrical bushings. Fastening arms extend rearwardly from the bushings to support the attachment on the housing and to resist torsion.

8 Claims, 5 Drawing Figures

SCREW FASTENED CLAMPING NECK ATTACHMENT FOR AN ELECTRICAL HAND OPERATED DRILL

CROSS REFERENCE TO RELATED APPLICATION

Reference is made to German patent application No. P 2,852,327.5 filed Dec. 4, 1978 in West Germany under which priority is claimed in accordance with 35 USC 119.

BACKGROUND OF THE INVENTION

Field of the Invention

The invention relates to the field of attachments for a hand operated electrical drilling machine and, in particular, to a screw fastened clamping attachment in the form of a neck which is adapted to be screwed on to the outer housing of a neckless electrical motor having a short shaft, the clamping neck of the attachment being adapted for extending the short shaft to fit the extension part of the attachment for screwing on to a drill chuck which, in turn, accomodates a drill.

Description of the Prior Art

1. Machine Body Types:

The commercially available hand operated electrical drilling machines may be divided into two different basic types, one with a neck or quill, the other neckless. The machines of the neck type are formed between the actual machine body and the drill chuck with a clamping neck, usually with the standard outside diameter of 43 mm, which neck is fixed rigidly to the machine body. In the case of the neckless machine type, the drill chuck adjoins the machine body directly. For the machines with a clamping neck there have been developed numerous supplementary implements such as circular saws, drilling uprights, oscillating grinders and hand milling machines, which have enlarged considerably the application range of these hand operated drilling machines. These supplementary implements cannot be used directly in connection with these machines but require special adapter parts.

2. Prior Art Attachments:

It is known to use a clamping frame or vice for neckless drilling machines which lies in a plane containing the drive shaft, embraces the entire machine body and discloses at the front a bushing surrounding the drive shaft and functioning as a clamping neck. On the opposite frame side a screw device is provided for the clamping of the frame onto the machine body. Such a frame makes possible the use of the above-mentioned supplementary implements in neckless drilling machines. However, such drilling machines continue to be inferior to the machines of the first type since the clamping frame with neck does not bring about a comparably stable support of the bearing shaft and is frequently in the way, making it difficult, for example, to exert strong pressure on the machine from the rear.

OBJECTS OF THE INVENTION

It is an object of the invention to provide a clamping neck attachment which can be quickly and easily used to refit a neckless electrical drilling machine to adapt said machine for the use of supplementary implements while at the same time providing a clamping neck which assures a stable positioning and alignment of the driven shaft of the attachment to the driving shaft of the neckless drilling machine. The stability and accuracy of alignment permits heavier milling work requiring more power.

Other and further objects will become apparent from the summary, more detailed description, drawings which illustrate a preferred embodiment, and the claims.

SUMMARY OF THE INVENTION

In accordance with the invention the stable, accurately positionable clamping neck attachment, useful for more powerful drilling and milling operations, comprises two semi-cylindrical bushing means which are constructed and arranged to be clamped together while framing an extension shaft which is carried within said two bushings. The semi-cylindrical bushing means are each formed at their back end with arcuately shaped arms in open Y form extending rearwardly from the two bushings. Threaded openings are provided at the arm ends for set screws to immobilize and fix the two bushings about the short shaft end of the neckless electrical drilling machine, with one of the bushing means constituting an upper semi-cylindrical bushing and the other constituting a lower semi-cylindrical bushing, the two encasing an extension shaft in its own bearings which is in substantially precise alignment with the short shaft of the neckless drilling machine. The rearwardly directed arcuate arms are close to the housing of the neckless drilling machine and secure each of the semi-cylindrical portions of both bushings to the neckless drilling machine in such an efficient manner that the attachment is virtually free of torsional forces during heavy milling or drilling operations. This effectiveness of resisting torsion is also due to the relatively light weight of the clamping neck attachment and to the simplicity of the accurately positioned extension shaft, supported for substantially frictionless movement in its own pair of spaced bearings, with the attachment. A further novel function of the extension shaft member of the attachment is the treaded fitting which it provides in its rear end which is formed as a short sleeve and tapped to provide threads engaging the threaded end of the short shaft of the neckless drilling machine. Thus, only a few hand movements are sufficient to attach the pair of bushings, attach the drill extension of the attachment and thereby accurately mount the said attachment. Likewise it is quickly removed. These advantages are of great importance in carrying out milling operations and the effective bushing and bearing support uniquely resists the stresses encountered in the radial direction during heavy milling.

A further novel feature which characterizes the present attachment device is that the arcuate rearwardly extending arms from each of the semi-cylindrical bushings have been designed for a standard diameter in the drilling machine filed, e.g., a diameter of 43 millimeters, so that with the provision of the set screw at the back ends of the arms at the location where the arms overlap the housing of the neckless drilling machine there is provided a quick fit for any of the commercially available neckless hand operated drilling machines. These set screws need only be turned down after positioning top and bottom bushings until contact is made with the machine housing to provide proper and complete support with the various types of commercial neckless machines.

BRIEF DESCRIPTION OF THE DRAWINGS

The invention is described in greater detail in the drawings as set forth below which illustrate a preferred embodiment of the attachment.

DESCRIPTION OF THE PREFERRED EMBODIMENT

Figure 1:
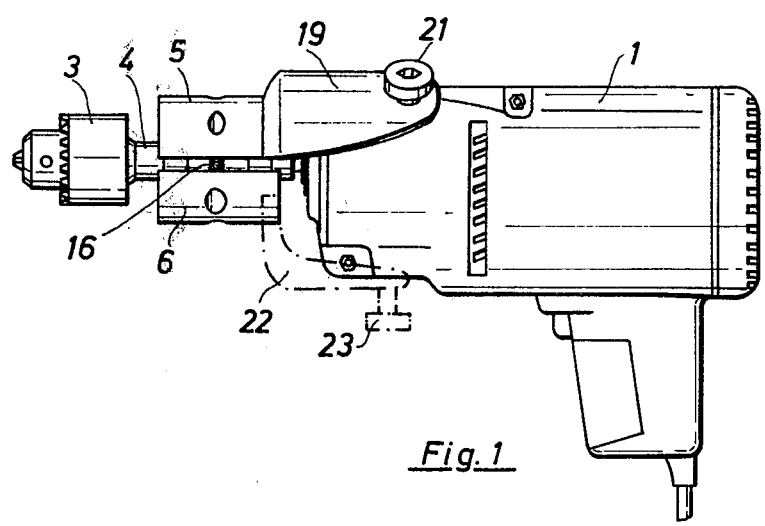
FIG. 1 is a side elevation view of a hand operated drilling machine fitted with a screwed on clamping neck attachment.
Figure 3:
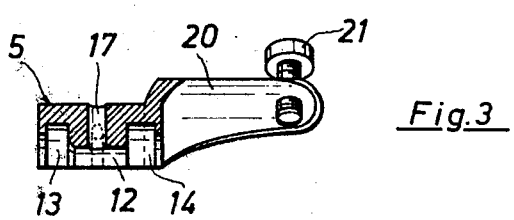
FIG. 3 is a section taken along line III—III in FIG. 2 but in which the section has been turned by 180°.
Figure 4:
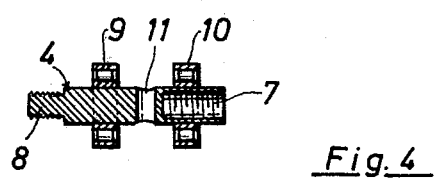
FIGS. 4 and 5 each show a section along lines IV—IV and V—V in FIG. 2 respectively.
Figure 5:
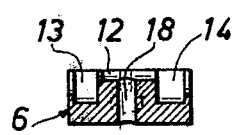
Figure 2:
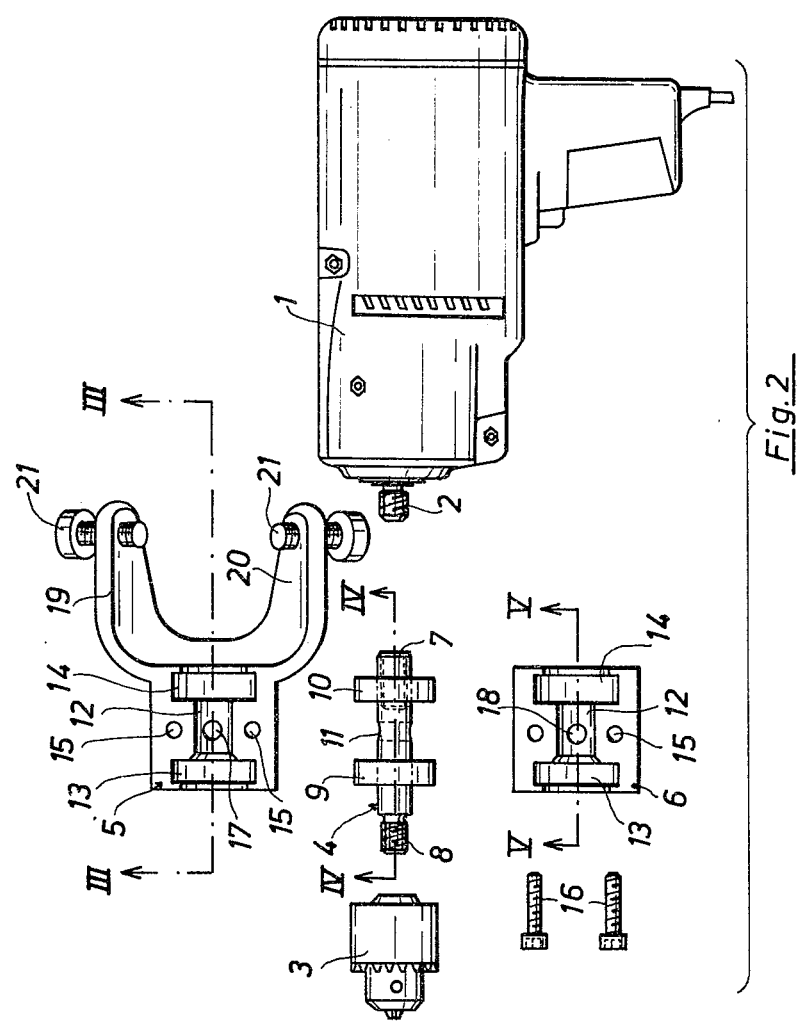
FIG. 2 is an exploded view corresponding to FIG. 1.

In FIGS. 1 and 2 there is shown in clamped on form and in detached exploded view respectively the relationship of the accurately positionable clamping neck attachment and the hand operated neckless electrical drilling machine which is the prior art machine made useful for drilling and milling by means of the clamping neck attachment of the present invention.

In the conventional, commercially available hand operated neckless electrical drilling machine, the housing 1 is fitted at its bottom rear end with the conventional handgrip and is provided with a short rotary shaft extending beyond the housing 1. The shaft is formed with a threaded front portion 2 and is ordinarily adapted for treadedly engaging a conventional drill chuck, shown in middle exploded portion of FIG. 2.

The clamping neck attachment consists essentially of a screw on extension shaft means including shaft 4 which has a thread-blend hole 7 at its rear end, as shown in FIG. 2, for engaging in sleeve fashion the threaded front portion of the short rotary shaft, two semi-cylindrical bushing means formed of upper bushing 5 and lower bushing 6 respectively and held with the mounted bushing means and two spaced apart antifriction bearings 9 and 10 affixed to and surrounding shaft 4.

At the end of the screw on extension shaft means of the attachment, which is remote from the screw on connection to the neckless motor at threaded collar 2, the shaft 4 is provided with a threaded end section 8 for the customary screw on attachment of the conventional drill chuck, shown best in exploded view in FIG. 2.

The type of bearing used for antifriction bearings 9 and 10 affixed to extension shaft 4 of the attachment may be roller bearings or ball bearings.

Between the two antifriction bearings 9 and 10, the extension shaft 4 is provided with a tapped diametrical borehole 11 which permits insertion of a releasable clamping tool to secure, by rotation, the unit holding the two bearings 9 and 10 and shaft 4. Opposite rotary movement releases shaft 4 from threaded collar 2.

The two semi-cylindrical bushings, upper bushing 5 and lower bushing 6, are each provided on their diametrical surface with semi-circular recesses 12, 13 and 14 for the reception of the extension shaft 4. By means of the screw 16, which is screwed into holes 15, the two bushings are clamped together in such a way that the outer rings of antifriction bearings 9 and 10 are fixed tightly in the bushings. At least one slot, slot 13, of the semicircular slots or grooves 13 and 14 is formed in axial direction and is just about as wide as the antifriction bearing 9 belonging to it, so that the bushings sit immovably in the axial direction on the extension shaft 4.

As shown in FIG. 2, the two bushings 5 and 6 are provided with radial boreholes 17 and 18 by means of which the diametrical borehole 11 of the extension shaft 4 can be brought in alignment. By means of a clamping or locking device, the extension shaft 4 can thus be held tight during the screwing on of the drill chuck 3.

The upper bushing 5, according to FIG. 1, supports on its rear end two curved arms 19 and 20 which embrace the front end of the machine body 1 with room for free play. Each arm has on its free end an arresting or stopping screw 21 to serve as a support on the machine body 1. These arms already provide a considerable support of the extension shaft 4 on the machine body 1 but in accordance with a preferred design, care may be taken to provide also the other bushing 6 with a rearward extending arm 22 with arresting screw 23. The result of the rearwardly extending arm supports is to provide a three-point support from extension shaft 4 directly connected to machine body 1.

Having thus disclosed, I now claim:

1. A clamping neck attachment for clamping onto the housing of a neckless electrical hand operated drilling machine which is provided with a short rotary shaft fitted with a threaded collar, said shaft projecting from the housing of the drilling machine, comprising:

an extension shaft formed with threaded connecting means at its rear end to fit it to said threaded collar and formed with a threaded section at the other end;

antifriction bearing means surrounding said extension shaft and fixed thereon;

two semi-cylindrical bushing means surrounding the extension shaft and provided with lateral holes for screws to clamp the two bushing means on said antifriction bearing means;

at least one of said semi-cylindrical bushing means formed at its back end with immobilizing arcuately shaped arms in open Y form to fit close to said housing; and said bushing means having threaded openings at the arm ends for set screws to immobilize and fix the bushings to said housing unit whereby the screw fastened bushing means constitute an extending neck for encasing said extension shaft of the attachment.

2. A clamping neck attachment as claimed in claim 1 wherein said antifriction bearing means comprises two spaced apart bearings which are fixed about said extension shaft and wherein said bearings are provided with outer rings fitting into grooves in each of said bushings to provide tight engagement with said bushings.

3. A clamping neck attachment as claimed in claim 2 wherein said extension shaft is provided with a diametrical borehole between said two spaced apart bearings for insertion of a tool to rotate by hand said extension shaft in one direction and lock the shaft to the collar of the neckless motor and in the other direction to unlock said shaft from the collar.

4. A clamping neck attachment as claimed in claim 3 wherein said semi-cylindrical bushings are provided with radial boreholes by means of which the borehole of said extension shaft is brought into alignment.

5. A clamping neck as claimed in claim 4 wherein the rear ends of the arms are provided with an arresting screw arranged vertically in relation to the extension shaft and bearing against the housing of the neckless motor.

6. A clamping neck attachment as claimed in claim 4 wherein one bushing is provided with two propping arms.

7. A clamping neck attachment as claimed in claim 5 wherein three arms in the form of a triangle are provided for said bushings about said housing with one bushing having two arms and the other bushing one arm.

8. A clamping attachment according to claim 1 wherein one bushing means is formed at its back end with one arcuately shaped arm to constitute a three prong closely fitting attachment means to hold said bushing means in axially immovable relation close to said housing.

* * * * *